United States Patent
Sakamoto et al.

(10) Patent No.: US 9,682,631 B2
(45) Date of Patent: Jun. 20, 2017

(54) NON-CONTACT ELECTRICITY SUPPLY DEVICE

(71) Applicant: DENSO CORPORATION, Kariya, Aichi-pref. (JP)

(72) Inventors: Akira Sakamoto, Obu (JP); Nobuhisa Yamaguchi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 874 days.

(21) Appl. No.: 14/039,071

(22) Filed: Sep. 27, 2013

(65) Prior Publication Data

US 2014/0285027 A1   Sep. 25, 2014

(30) Foreign Application Priority Data

Mar. 21, 2013  (JP) .................................. 2013-57790

(51) Int. Cl.
*B60L 11/18* (2006.01)

(52) U.S. Cl.
CPC ......... *B60L 11/182* (2013.01); *B60L 11/1824* (2013.01); *B60L 11/1833* (2013.01); *B60L 11/1842* (2013.01); *B60L 11/1844* (2013.01); *B60L 11/1846* (2013.01); *B60L 2210/12* (2013.01); *B60L 2210/14* (2013.01); *B60L 2210/30* (2013.01); *B60L 2210/40* (2013.01); *B60L 2240/527* (2013.01); *B60L 2240/529* (2013.01); *Y02E 60/721* (2013.01); *Y02T 10/7005* (2013.01); *Y02T 10/7072* (2013.01); *Y02T 10/7225* (2013.01); *Y02T 10/7233* (2013.01); *Y02T 10/7241* (2013.01);

(Continued)

(58) Field of Classification Search
CPC .......................... B60L 11/1844; B60L 11/1842
See application file for complete search history.

(56) References Cited

U.S. PATENT DOCUMENTS 4,355,243 A * 10/1982 Tellert ............... H02M 7/53803
                                                       327/129
6,515,878 B1 * 2/2003 Meins ..................... B60L 5/005
                                                       191/10

(Continued)

FOREIGN PATENT DOCUMENTS

JP   2012-105503 A   5/2012
JP   2012105503 A  * 5/2012 .............. H02J 17/00

*Primary Examiner* — Thienvu Tran
*Assistant Examiner* — Pinping Sun

(57) ABSTRACT

A power-supply-side coil receives an alternating current from an AC power source to produce a magnetic flux. A power-supply-side capacitor is connected in parallel with the power-supply-side coil. A power-supply-side filter circuit includes a reactor and a capacitor, which are connected in series between the AC power source and the power-supply-side coil. A power-receiving-side coil is interlinked with a magnetic flux produced by the power-supply-side coil to produce an alternating current. The power-supply-side filter circuit, the power-supply-side capacitor, and the power-supply-side form a circuit having an impedance having a frequency characteristic, in which a frequency of a minimum point formed on a high-frequency side relative to a maximum point is greater than a frequency of a fundamental wave of an alternating current supplied from the AC power source and is less than a frequency of a third order wave of the fundamental wave.

6 Claims, 7 Drawing Sheets

(52) U.S. Cl.
CPC ............ *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | | |
|---|---|---|---|---|
| 7,852,293 | B2* | 12/2010 | Park | G09G 3/296 345/60 |
| 8,373,394 | B1* | 2/2013 | Huta | G05F 1/70 323/211 |
| 2010/0109445 | A1* | 5/2010 | Kurs | B60L 11/007 307/104 |
| 2012/0056580 | A1* | 3/2012 | Kai | H02J 5/005 320/108 |
| 2012/0155134 | A1* | 6/2012 | Kim | H02J 5/005 363/84 |
| 2012/0161534 | A1* | 6/2012 | Urano | H02J 17/00 307/104 |
| 2013/0049593 | A1* | 2/2013 | Sugino | H05H 1/46 315/111.41 |

\* cited by examiner

NON-CONTACT ELECTRICITY SUPPLY DEVICE

CROSS REFERENCE TO RELATED APPLICATION

This application is based on reference Japanese Patent Application No. 2013-57790 filed on Mar. 21, 2013, the disclosure of which is incorporated herein by reference.

TECHNICAL FIELD

The present disclosure relates to a non-contact electricity supply device including a power-supply-side coil, a power-receiving-side coil, a power-supply-side capacitor for a resonant circuit, and a power-supply-side filter circuit.

BACKGROUND

For example, a patent document 1 discloses a conventional non-contact electricity supply device including a power-supply-side coil, a power-receiving-side coil, a power-supply-side capacitor for a resonant circuit, and a power-supply-side filter circuit.

The non-contact electricity supply device includes a primary winding and a secondary winding. The non-contact electricity supply device further includes a capacitor for a resonant circuit and a filter circuit.

The primary winding is an element supplied with an alternating current from a high frequency AC power source to produce an alternating magnetic flux. The secondary winding is an element interlinked with the alternating magnetic flux, which is produced by the primary winding, to produce an alternating current. The capacitor is an element, which configures a resonant circuit with the primary winding. The capacitor is connected in parallel with the primary winding. The filter circuit removes a predetermined frequency component, which is included in an alternating current supplied from the high frequency AC power source. The filter circuit is configured with a coil and a capacitor, which are connected in series with each other. The filter circuit is connected between the high frequency AC power source and the primary winding.

A circuit, which is configured with the filter circuit, the capacitor, and the primary winding, has an impedance having a frequency characteristic including one maximum point and two minimum points. One of the two minimum point is caused by a resonance of a circuit, which is configured with the filter circuit and the primary winding. The one of the two minimum points is formed on the low frequency side relative to a frequency of the maximum point. The other of the two minimum points is caused by a resonance of a circuit, which is configured with the filter circuit and the capacitor. The other minimum point is formed on a high frequency side relative to the frequency of the maximum point.

The high frequency AC power source supplies an alternating current in a rectangular waveform. Therefore, the alternating current supplied from the high frequency AC power source includes a frequency component of a fundamental wave and odd-order harmonics components of the fundamental wave. In general, the frequency of the fundamental wave of the alternating current supplied from the high frequency AC power source is set at a frequency close to the maximum point to suppress an electric current to be supplied.

PATENT DOCUMENT 1

Publication of Unexamined Japanese Patent Application No. 2012-105503

It is assumable that a circuit, which is configured with the filter circuit, the capacitor, and the primary winding, has an impedance having a frequency characteristic. In this frequency characteristic, it is further assumed that the frequency of the minimum point, which is formed on the high frequency side relative to the maximum point, coincides with the frequency of the third order wave of the fundamental wave. In such a case, an electric current of the third order harmonics component, which has the largest amplitude in the odd-order harmonics components and is ineffective to power supply, may increase. Consequently, a loss may increase in power supply.

SUMMARY

It is an object of the present disclosure to produce a non-contact electricity supply device configured to suppress a loss caused by a harmonics component included in an alternating current supplied from an AC power source.

According to an aspect of the present disclosure, a non-contact electricity supply device comprises a power-supply-side coil configured to receive an alternating current, which is supplied from an AC power source to produce a magnetic flux. The non-contact electricity supply device further comprises a power-supply-side capacitor connected in parallel with the power-supply-side coil to form, with the power-supply-side coil, a resonant circuit. The non-contact electricity supply device further comprises a power-supply-side filter circuit connected between the AC power source and the power-supply-side coil, to which the power-supply-side capacitor is connected, the power-supply-side filter circuit including a reactor and a capacitor, which are connected in series. The non-contact electricity supply device further comprises a power-receiving-side coil configured to be interlinked with a magnetic flux produced by the power-supply-side coil to produce an alternating current. The capacitance of the capacitor and the inductance of the reactor of the power-supply-side filter circuit, the capacitance of the power-supply-side capacitor, and the inductance of the power-supply-side coil are set, such that, a circuit, which includes the power-supply-side filter circuit, the power-supply-side capacitor, and the power-supply-side coil, has an impedance having a frequency characteristic, in which a frequency of a minimum point, which is formed on a high-frequency side relative to a maximum point, is greater than a frequency of a fundamental wave of an alternating current supplied from the AC power source and is less than a frequency of a third order wave of the fundamental wave.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, embodiments of the present disclosure will be described in detail. In the present embodiment, a non-contact electricity supply device according to the present disclosure is employed for supplying electricity to a vehicular battery, which is equipped to an electric vehicle and/or a hybrid vehicle, with a non-contact configuration.

First Embodiment

First, a configuration of the non-contact electricity supply device according to the first embodiment will be described with reference to FIG. 1.

Figure 1:
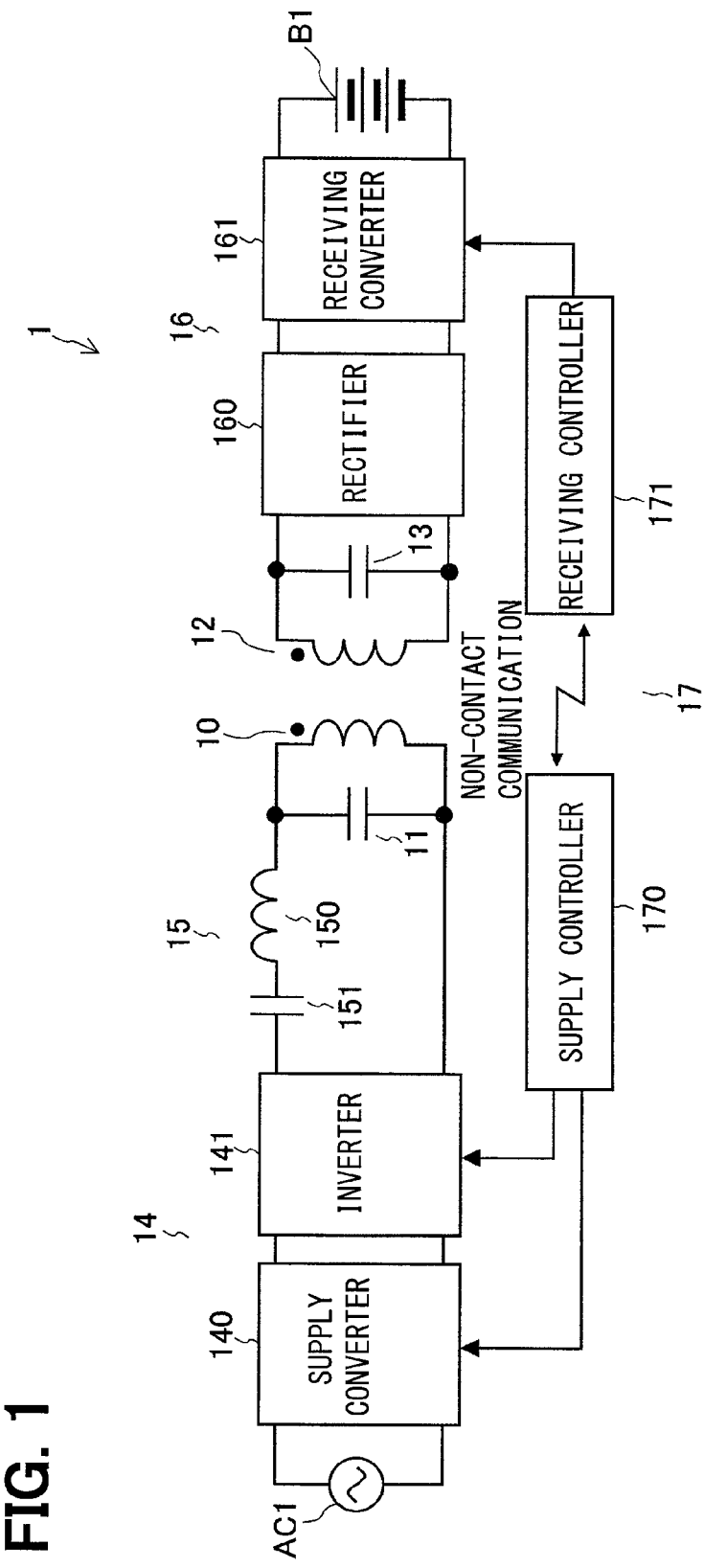
FIG. 1 is a diagram showing a non-contact electricity supply device according to a first embodiment.

As shown in FIG. 1, a non-contact electricity supply device 1 has a non-contact electricity supply configuration to transmit electricity from a commercial power source (AC power source) AC1 outside a vehicle to a vehicular battery B1 equipped in the vehicle, thereby to charge the vehicular battery B1. The non-contact electricity supply device 1 includes a power-supply-side coil 10, a power-supply-side capacitor 11, a power-receiving-side coil 12, a power-receiving-side capacitor 13, a power supply circuit (AC power source) 14, a power-supply-side filter circuit 15, a power receiving circuit 16, and a control circuit 17.

The power-supply-side coil 10 is an element to produce an alternating magnetic flux when being supplied with by an alternating current. The power-supply-side coil 10 is located at a predetermined position in (or on) an earth surface of a parking space.

The power-supply-side capacitor 11 is an element, which configures a resonant circuit with the power-supply-side coil 10. The power-supply-side capacitor 11 is connected in parallel with the power-supply-side coil 10.

The power-receiving-side coil 12 is an element interlinked with the power-supply-side coil 10 to receive the alternating magnetic flux produced by the power-supply-side coil 10 thereby to implement electromagnetic induction to produce an alternating current. The power-receiving-side coil 12 is equipped to a bottom of the vehicle such that the power-receiving-side coil 12 is opposed to the power-supply-side coil 10 with a space in the vertical direction when the vehicle is parked at the parking space.

The power-receiving-side capacitor 13 is an element, which configures a resonant circuit with the power-receiving-side coil 12. The power-receiving-side capacitor 13 is connected in parallel with the power-receiving-side coil 12.

In such a configuration, an inductance of the power-supply-side coil 10 and an inductance of the power-receiving-side coil 12 are set in consideration of a size of the parking space, a size of the vehicle, the space between the earth surface of the parking space and the bottom of the vehicle, and/or the like. A capacitance of the power-supply-side capacitor 11 and a capacitance of the power-receiving-side capacitor 13 are set, such that a power factor of an alternating current supplied from the power supply circuit 14 to the power-supply-side coil 10, to which the power-supply-side capacitor 11 is connected, becomes 1, when the power-supply-side coil 10 and the power-receiving-side coil 12 are in a predetermined reference opposed state. Alternatively, the capacitance of the power-supply-side capacitor 11 and the capacitance of the power-receiving-side capacitor 13 are set within a range, in which the capacitances can be set, such that the power factor of the alternating current becomes a value close to 1, as much as possible.

The power supply circuit 14 converts an alternating current supplied from the commercial power source AC1 into an alternating current at a high frequency. The power supply circuit 14 further supplies the converted alternating current to the power-supply-side coil 10, to which the power-supply-side capacitor 11 is connected. The power supply circuit 14 includes a power-supply-side converter circuit 140 and an inverter circuit 141.

The power-supply-side converter circuit 140 converts an alternating current supplied from the commercial power source AC1 into a direct current and supplies the converted direct current to an inverter circuit 141. The power-supply-side converter circuit 140 is configured with a rectification circuit and a DC/DC converter circuit. The rectification circuit includes diodes in a bridge connection. The power-supply-side converter circuit 140 is connected to both the commercial power source AC1 and the inverter circuit 141.

The inverter circuit 141 converts a direct current, which is supplied from the power-supply-side converter circuit 140, into an alternating current, which is in a rectangular waveform and at a high frequency. The inverter circuit 141 further supplies the converted alternating current through the power-supply-side filter circuit 15 to the power-supply-side coil 10, to which the power-supply-side capacitor 11 is connected. The inverter circuit 141 includes IGBTs in a bridge connection. Each of the IGBTs is connected in anti-parallel with a freewheel diode (flywheel diode). The IGBTs are switched thereby to convert a direct current, which is supplied from the power-supply-side converter circuit 140, into an alternating current, which is in a rectangular waveform and at a high frequency. The converted alternating current is further supplied though the power-supply-side filter circuit 15 to the power-supply-side coil 10, to which the power-supply-side capacitor 11 is connected. The inverter circuit 141 is connected to the power-supply-side converter circuit 140. The inverter circuit 141 is further connected through the power-supply-side filter circuit 15 to the power-supply-side coil 10, to which the power-supply-side capacitor 11 is connected.

The power-supply-side filter circuit 15 removes a predetermined frequency component included in an alternating current supplied from the inverter circuit 141. The power-supply-side filter circuit 15 includes a reactor 150 and a capacitor 151, which are connected in series. The power-supply-side filter circuit 15 is connected between the inverter circuit 141 and the power-supply-side coil 10, to which the power-supply-side capacitor 11 is connected.

Figure 2:
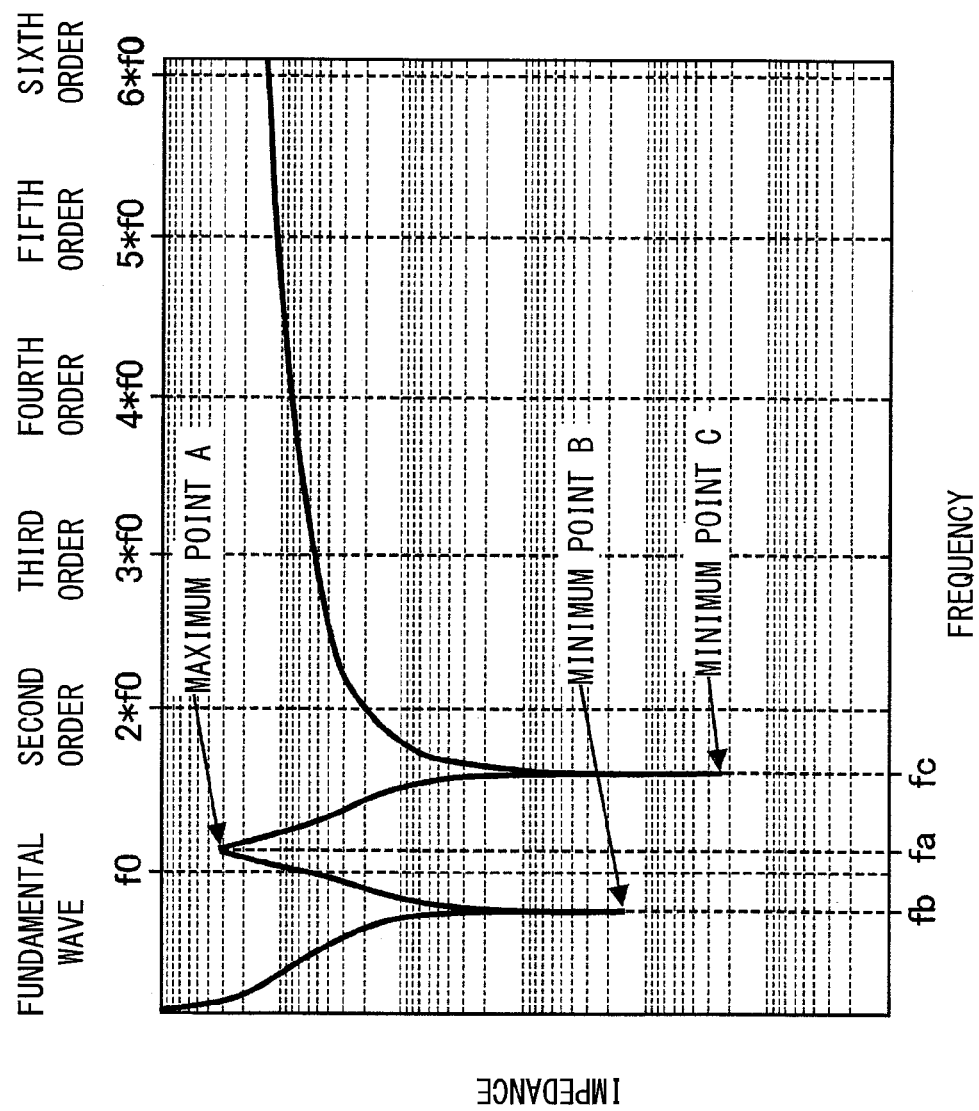
FIG. 2 is a graph showing a frequency characteristic of an impedance of a circuit, which is configured with a power-supply-side filter circuit, a power-supply-side capacitor, and a power-supply-side coil, shown in FIG. 1.

As shown in FIG. 2, a circuit, which is configured with the power-supply-side filter circuit 15, the power-supply-side capacitor 11, and the power-supply-side coil 10, has an impedance having a frequency characteristic viewed from the power supply circuit 14. The frequency characteristic shown in FIG. 2 includes one maximum point A and two minimum points B and C. The minimum point B is formed due to a resonance caused by a circuit, which is configured with the power-supply-side filter circuit 15 and the power-supply-side coil 10. The minimum point B is formed on a low frequency side relative to the maximum point A at a frequency fa. The minimum point C is formed due to a resonance caused by a circuit, which is configured with the power-supply-side filter circuit 15 and the power-supply-side capacitor 11. The minimum point C is formed on a high frequency side relative to the maximum point A at the frequency fa.

In the present configuration of FIG. 1, the inductance of the reactor 150 and the capacitance of the capacitor 151 are set, such that a frequency fc of the minimum point C in FIG. 2 is greater than a frequency f0 of a fundamental wave of an alternating current, which is in a rectangular waveform and supplied from the inverter circuit 141, and the frequency fc is less than a frequency of a third order wave of the fundamental wave. More specifically, the inductance of the reactor 150 and the capacitance of the capacitor 151 are set, such that the frequency fc is greater than the frequency f0 of the fundamental wave, and the frequency fc is less than a frequency of a second order wave of the fundamental wave. More specifically, the inductance of the reactor 150 and the capacitance of the capacitor 151 are set, such that the frequency fc is 1.7 times the frequency f0 of the fundamental wave.

The frequency fc of the minimum point C can be set by modifying the inductance of the power-supply-side coil 10 and the capacitance of the power-supply-side capacitor 11. However, the inductance of the power-supply-side coil 10 and the capacitance of the power-supply-side capacitor 11 may not be freely modified because of other constraints, and therefore, the frequency fc is set by modifying the inductance of the reactor 150 and the capacitance of the capacitor 151.

Referring back to FIG. 1, the power receiving circuit 16 converts an alternating current supplied from the power-receiving-side coil 12, to which the power-receiving-side capacitor 13 is connected, into a direct current. The power receiving circuit 16 further supplies the converted direct current to the vehicular battery B1. The power receiving circuit 16 includes a rectification circuit 160 and a power-receiving-side converter circuit 161.

The rectification circuit 160 rectifies an alternating current supplied from the power-receiving-side coil 12, to which the power-receiving-side capacitor 13 is connected, to convert the alternating current into a direct current. The rectification circuit 160 further supplies the converted direct current to the power-receiving-side converter circuit 161. The rectification circuit 160 includes diodes in a bridge connection. The rectification circuit 160 is connected to the power-receiving-side coil 12, to which the power-receiving-side capacitor 13 is connected. The rectification circuit 160 is further connected to the power-receiving-side converter circuit 161.

The power-receiving-side converter circuit 161 converts a direct current supplied from the rectification circuit 160 into a direct current from at a different voltage. The power-receiving-side converter circuit 161 further supplies the converted direct current to the vehicular battery B1. The power-receiving-side converter circuit 161 is configured with a DC/DC converter circuit. The power-receiving-side converter circuit 161 is connected to both the rectification circuit 160 and the vehicular battery B1.

The control circuit 17 controls the power supply circuit 14 and the power receiving circuit 16 to control power supply from the commercial power source AC1 to the vehicular battery B1. The control circuit 17 includes a power-supply-side control circuit 170 and a power-receiving-side control circuit 171.

The power-supply-side control circuit 170 exchanges information, which is need for control, with the power-receiving-side control circuit 171 via wireless communications, thereby to implement the control of the power-supply-side converter circuit 140 and the inverter circuit 141. The power-supply-side control circuit 170 is connected to both the power-supply-side converter circuit 140 and the inverter circuit 141.

The power-receiving-side control circuit 171 exchanges information, which is needed for control, with the power-supply-side control circuit 170 via wireless communications, thereby to implement the control of the power-receiving-side converter circuit 161. The power-receiving-side control circuit 171 is connected to the power-receiving-side converter circuit 161.

Figure 3:
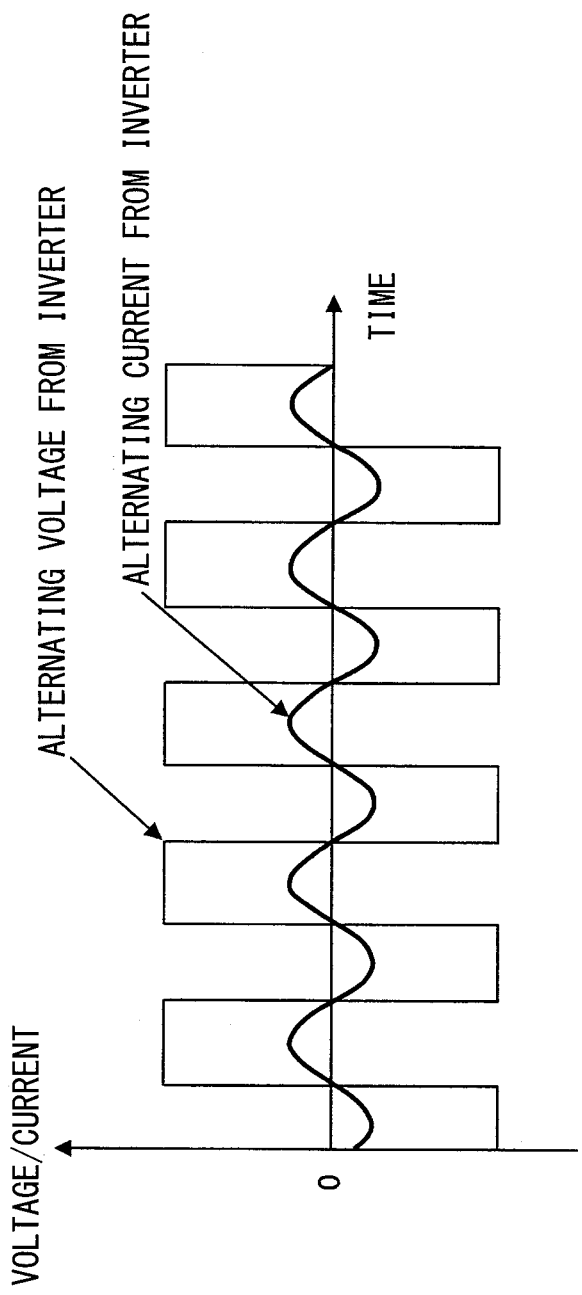
FIG. 3 is a waveform chart showing an alternating voltage and an alternating current supplied from an inverter circuit shown in FIG. 1.

Subsequently, an operation of the non-contact electricity supply device will be described with reference to FIGS. 1 to 3.

When the vehicle is parked at a parking space, the power-supply-side coil 10 and the power-receiving-side coil 12 shown in FIG. 1 are opposed to each other and are located at a relative position in a predetermined range in the vertical direction, in the front-back direction, and in the horizontal direction. In the present state, a charge start button (not shown) is operated to instruct the non-contact electricity supply device 1 to start a charging operation.

The power-supply-side converter circuit 140 is controlled by the power-supply-side control circuit 170 to convert an alternating current supplied from the commercial power source AC1 into a direct current and to supply the converted direct current to the inverter circuit 141. The inverter circuit 141 is controlled by the power-supply-side control circuit 170 to convert a direct current supplied from the power-supply-side converter circuit 140 into an alternating current, which is in a rectangular waveform and at a high frequency, such as tens of kHz. Thus, the inverter circuit 141 supplies the converted alternating current through the power-supply-side filter circuit 15 to the power-supply-side coil 10, to which the power-supply-side capacitor 11 is connected. The power-supply-side filter circuit 15 removes a predetermined frequency component, which is included in the alternating current supplied from the inverter circuit 141. The power-supply-side coil 10, to which the power-supply-side capacitor 11 is connected, is supplied with an alternating current from the inverter circuit 141 thereby to generate an alternating magnetic flux.

As shown in FIG. 2, the circuit, which is configured with the power-supply-side filter circuit 15, the power-supply-side capacitor 11, and the power-supply-side coil 10, has an impedance having the frequency characteristic. In the frequency characteristic, the frequency fc of the minimum point C is set at a value, which is 1.7 times the frequency of the fundamental wave of an alternating current, which is in a rectangular waveform and supplied from the inverter circuit 141. Therefore, as shown in FIG. 3, a third order harmonics component of a fundamental wave of an electric current can be suppressed, and therefore, an alternating current close to a fundamental wave can be produced.

As shown in FIG. 1, the power-receiving-side coil 12, to which the power-receiving-side capacitor 13 is connected, is interlinked with the alternating magnetic flux generated by the power-supply-side coil 10 thereby to implement an electromagnetic induction to produce an alternating current. The rectification circuit 160 receives an alternating current supplied from the power-receiving-side coil 12, to which the power-receiving-side capacitor 13 is connected, and rectifies the received alternating current to convert the received alternating current into a direct current. The rectification circuit 160 further supplies the converted direct current to the power-receiving-side converter circuit 161. The power-receiving-side converter circuit 161 is controlled by the power-receiving-side control circuit 171 to convert a direct current, which is supplied from the rectification circuit 160, into a direct current at a different voltage. The power-receiving-side converter circuit 161 further supplies the converted direct current to the vehicular battery B1 to charge the vehicular battery B1. In such a way, electricity can be transmitted from the commercial power source AC1 to the vehicular battery B1 in the non-contact configuration.

Subsequently, an operation effect of the present configuration will be described.

Figure 4:
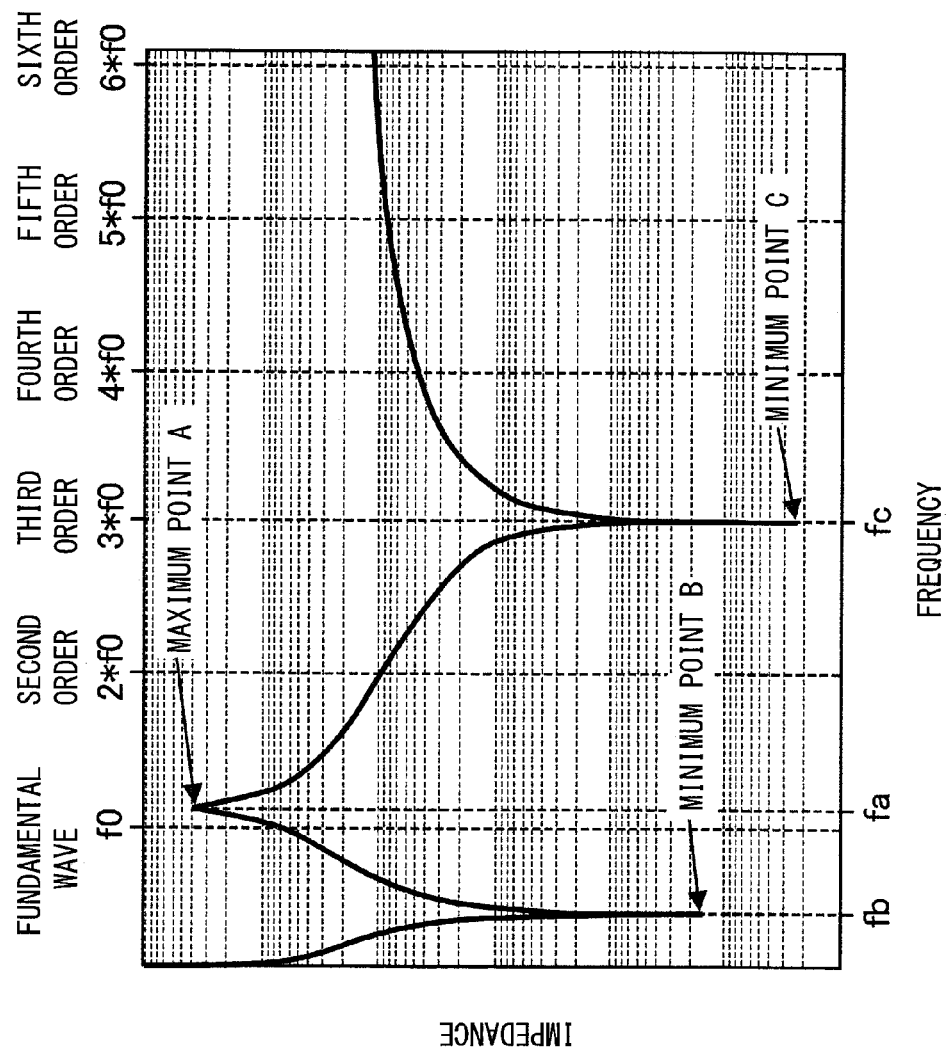
FIG. 4 is a graph showing a frequency characteristic of an impedance of a configuration in which a frequency of a minimum point coincides with a third order harmonics of a fundamental wave.
Figure 5:
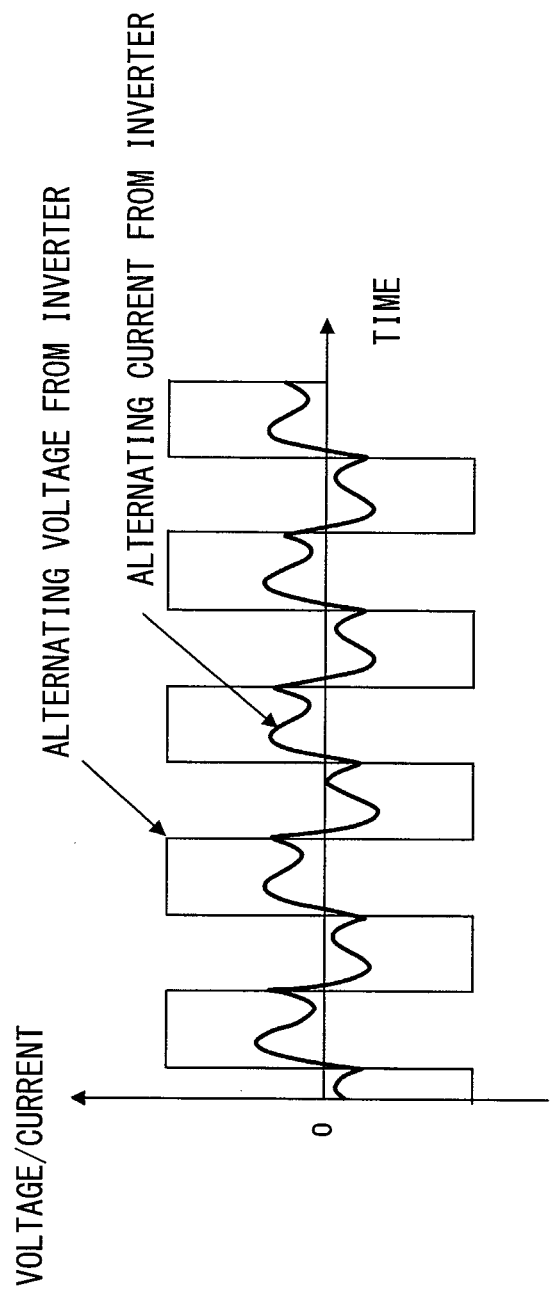
FIG. 5 is a graph showing an alternating voltage and an alternating current supplied from an inverter circuit in a configuration in which a frequency of a minimum point coincides with a third order harmonics of a fundamental wave.

The alternating current supplied from the inverter circuit 141 is in a rectangular waveform. Therefore, the supplied alternating current contains a frequency component of the fundamental wave and an odd-order harmonics component of the fundamental wave. A condition will be assumed with reference to FIG. 4. In FIG. 4, the frequency fc of the minimum point C coincides with a frequency of a third order wave of the fundamental wave in a frequency characteristic of impedance of the circuit, which is configured with the power-supply-side filter circuit 15, the power-supply-side capacitor 11, and the power-supply-side coil 10. In such a case, as shown in FIG. 5, an electric current of a third order harmonics component increases. The electric current of the third order harmonics component has the largest amplitude among odd-order harmonics components and is not effective to power supply.

It is noted that, according to the first embodiment, as shown in FIG. 2, the inductance of the reactor 150, the capacitance of the capacitor 151, the capacitance of the power-supply-side capacitor 11, and the inductance of the power-supply-side coil 10 in the power-supply-side filter circuit 15 are set, such that the frequency fc of the minimum point C becomes greater than the frequency f0 of the fundamental wave, and the frequency fc becomes less than the frequency of the third order wave of the fundamental wave. Therefore, an impedance can be increased relative to the third order harmonics component of the fundamental wave. Thus, as shown in FIG. 3, it is possible to suppress increase in an electric current of the third order harmonics component, which has the largest amplitude among odd-order harmonics components and is not effective to power supply. The present configuration enables to suppress a loss caused by a harmonics component contained in an alternating current supplied from the inverter circuit 141.

In a case where an alternating current supplied from the inverter circuit 141 is offset to a positive side or to a negative side, the alternating current contains an even-order harmonics of the fundamental wave.

It is noted that, according to first embodiment, as shown in FIG. 2, the frequency fc of the minimum point C is set at a frequency other than a frequency of a second order wave of the fundamental wave. Therefore, an impedance can be increased relative to the second order harmonics component of the fundamental wave. Thus, it is possible to suppress increase in an electric current of the second order harmonics component, which has the largest amplitude among even-order harmonics components and is not effective to power supply. The present configuration enables to suppress a loss caused by a harmonics component, even in a case where an alternating current supplied from the inverter circuit 141 is offset to the positive side or to the negative side to contain an even-order harmonics component.

According to the first embodiment, the frequency fc of the minimum point C is set to be greater than the frequency f0 of the fundamental wave and to be less than the frequency of the second order wave of the fundamental wave. Therefore, an impedance can be increased relative to a harmonics component higher in frequency than the second order harmonics component of the fundamental wave. Thus, the present configuration enables to suppress emission of a noise.

According to the first embodiment, the frequency fc of the minimum point C is set to be 1.7 times the frequency of the fundamental wave, nevertheless, the present disclosure is not limited to this example. For example, the frequency fc of the minimum point C may be set to be 1.5 times the frequency of the fundamental wave.

According to the first embodiment, the frequency fc of the minimum point C is set to be greater than the frequency f0 of the fundamental wave and to be less than the frequency of the second order wave of the fundamental wave, nevertheless, the present disclosure is not limited to this example. The frequency fc of the minimum point C may be set to be greater than the frequency of the second order wave of the fundamental wave and to be less than the frequency of the third order wave of the fundamental wave. For example, the frequency fc of the minimum point C may be set to be 2.5 times the frequency of the fundamental wave. In a case where the frequency fc of the minimum point C is set by modifying the inductance of the reactor 150 of the power-supply-side filter circuit 15, when the inductance of the reactor 150 is decreased, the frequency fc of the minimum point C increases. Therefore, the inductance of the reactor 150 can be decreased, compared with a configuration in which the frequency fc of the minimum point C is set to be greater than the frequency f0 of the fundamental wave and to be less than the frequency of the second order wave of the fundamental wave. That is, the number of turn can be decreased in the reactor 150. The present configuration enables to suppress a loss and to enhance an efficiency.

Furthermore, in the example according to the first embodiment, since the inductance of the power-supply-side coil 10 and the capacitance of the power-supply-side capacitor 11 cannot be modified freely due to other constraints, the inductance of the reactor 150 of the power-supply-side filter circuit 15 and the capacitance of the capacitor 151 are modified to set the frequency fc of the minimum point C. It is noted that, the present disclosure is not limited to this example. In a configuration where the inductance of the power-supply-side coil 10 and the capacitance of the power-supply-side capacitor 11 can be modified freely, the inductance of the power-supply-side coil 10 and the capacitance of the power-supply-side capacitor 11 may be modified to set the frequency fc of the minimum point C.

In the example of the first embodiment, the non-contact electricity supply device related to the present disclosure is employed in the non-contact configuration to transmit an electricity to the vehicular battery equipped in an electric vehicle or a hybrid vehicle. It is noted that, the present disclosure is not limited to this example. The non-contact electricity supply device related to the present disclosure may be employed in a non-contact configuration to transmit an electricity to a home appliance.

Second Embodiment

Subsequently, a non-contact electricity supply device according to the second embodiment will be described. In the first embodiment, the non-contact electricity supply device includes the power-supply-side filter circuit including the one pair of the reactor and the capacitor, which are connected in series with each other. To the contrary, the non-contact electricity supply device according to the second embodiment includes a power-supply-side filter circuit including two pairs each including a reactor and a capacitor, which are connected in series with each other.

The configuration of the non-contact electricity supply device of the second embodiment will be described with reference to FIG. 6.

Figure 6:
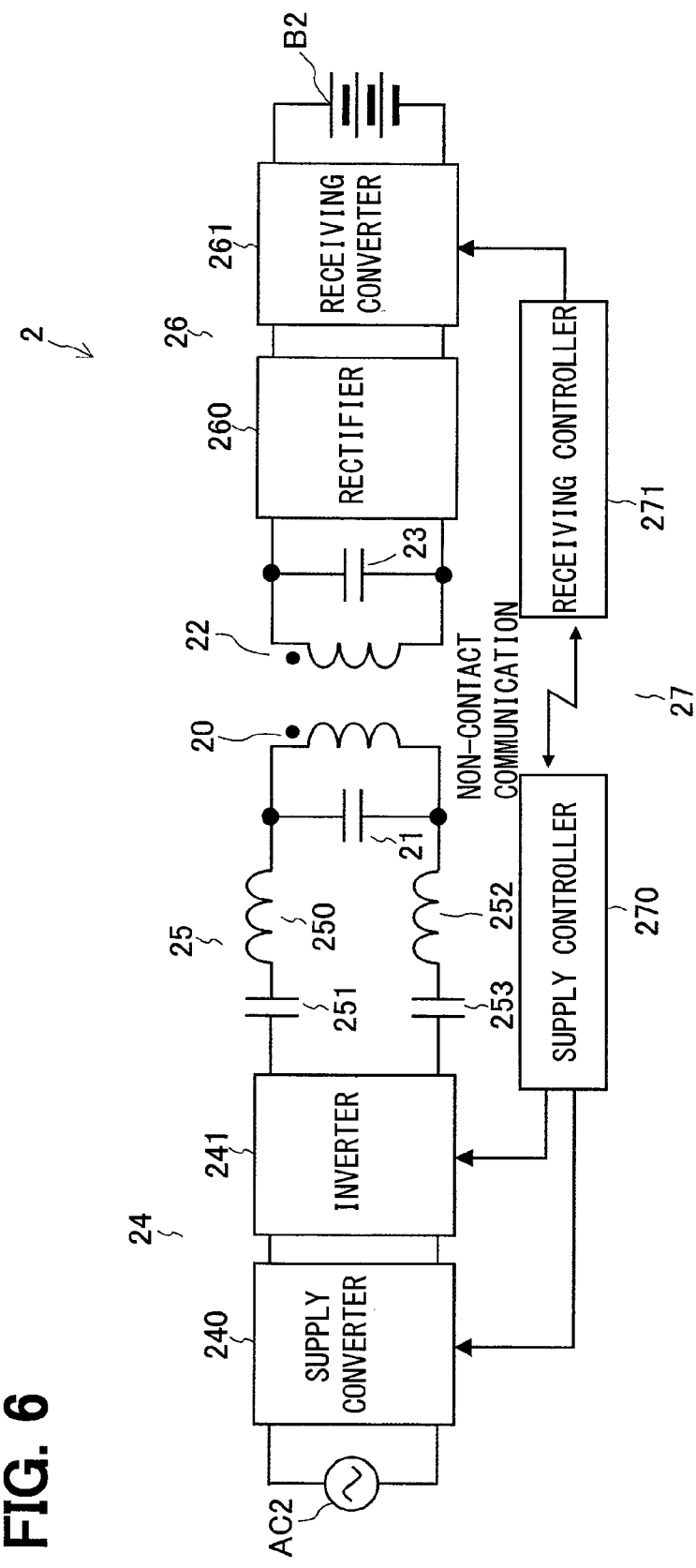
FIG. 6 is a diagram showing a non-contact electricity supply device according to a second embodiment.

The non-contact electricity supply device 2 shown in FIG. 6 has a non-contact configuration to transmit an electricity from a commercial power source (AC power source) AC2 outside the vehicle to a vehicular battery B2 thereby to charge the vehicular battery B2. The non-contact electricity supply device 2 includes a power-supply-side coil 20, a power-supply-side capacitor 21, a power-receiving-side coil 22, a power-receiving-side capacitor 23, a power supply circuit (AC power source) 24, a power-supply-side filter circuit 25, a power receiving circuit 26, and a control circuit 27.

The power-supply-side coil 20, the power-supply-side capacitor 21, the power-receiving-side coil 22, the power-receiving-side capacitor 23, and the power supply circuit 24 have configurations substantially equivalent to the configurations of the power-supply-side coil 10, the power-supply-side capacitor 11, the power-receiving-side coil 12, the power-receiving-side capacitor 13, and the power supply circuit 14 of first embodiment, respectively.

The power-supply-side filter circuit 25 is configured with two pairs including a reactor 250 and a capacitor 251, which are connected in series, and a reactor 252 and a capacitor 253, which are connected in series. The inductance of the reactor 250 is equivalent to the inductance of the reactor 252. The capacitance of the capacitor 251 is equivalent to the capacitance of the capacitor 253. The reactor 250 and the capacitor 251 are connected between one output end of an inverter circuit 241 and one end of the power-supply-side coil 20, to which the power-supply-side capacitor 21 is connected. The reactor 252 and the capacitor 253 are connected between the other output end of the inverter circuit 241 and the other end of the power-supply-side coil 20, to which the power-supply-side capacitor 21 is connected.

The power receiving circuit 26 and the control circuit 27 have configurations, which are substantially equivalent to the configurations of the power receiving circuit 16 and the control circuit 17 of the first embodiment.

The operation of the second embodiment is substantially equivalent to the operation of the first embodiment, and therefore, description of the operation is omitted.

Subsequently, an operation effect of the second embodiment will be described.

The power-supply-side filter circuit 25 according to second embodiment is configured with the two pairs of the reactors and capacitors, which are connected in series and have substantially the same inductance and the capacitance. The reactor 250 and the capacitor 251 are connected between the one output end of the inverter circuit 241 and the one end of the power-supply-side coil 20, to which the power-supply-side capacitor 21 is connected. The reactor 252 and the capacitor 253 are connected between the other output end of the inverter circuit 241 and the other end of the power-supply-side coil 20, to which the power-supply-side capacitor 21 is connected. It is assumable a case where an earth capacitance varies in one of the pair of paths, which is from the inverter circuit 241 through the power-supply-side filter circuit 25 and wiring cables to the one end and the other end of the power-supply-side coil 20. Even in such a case, in the present configuration, a predetermined frequency component can be removed in the other path. Therefore, an influence due to a noise can be suppressed.

Third Embodiment

Subsequently, a non-contact electricity supply device according to the third embodiment will be described. As described above, the non-contact electricity supply device of the first embodiment transmits an electricity from the commercial power source to the vehicular battery. To the contrary, a non-contact electricity supply device according to the third embodiment has configurations of the power supply circuit and the power receiving circuit and causes a control circuit to implement a control, which are partially modified from those of the first embodiment, thereby to enable transmission of an electricity from the vehicular battery to the commercial power source.

The configuration of the non-contact electricity supply device of the third embodiment will be described with reference to FIG. 7.

Figure 7:
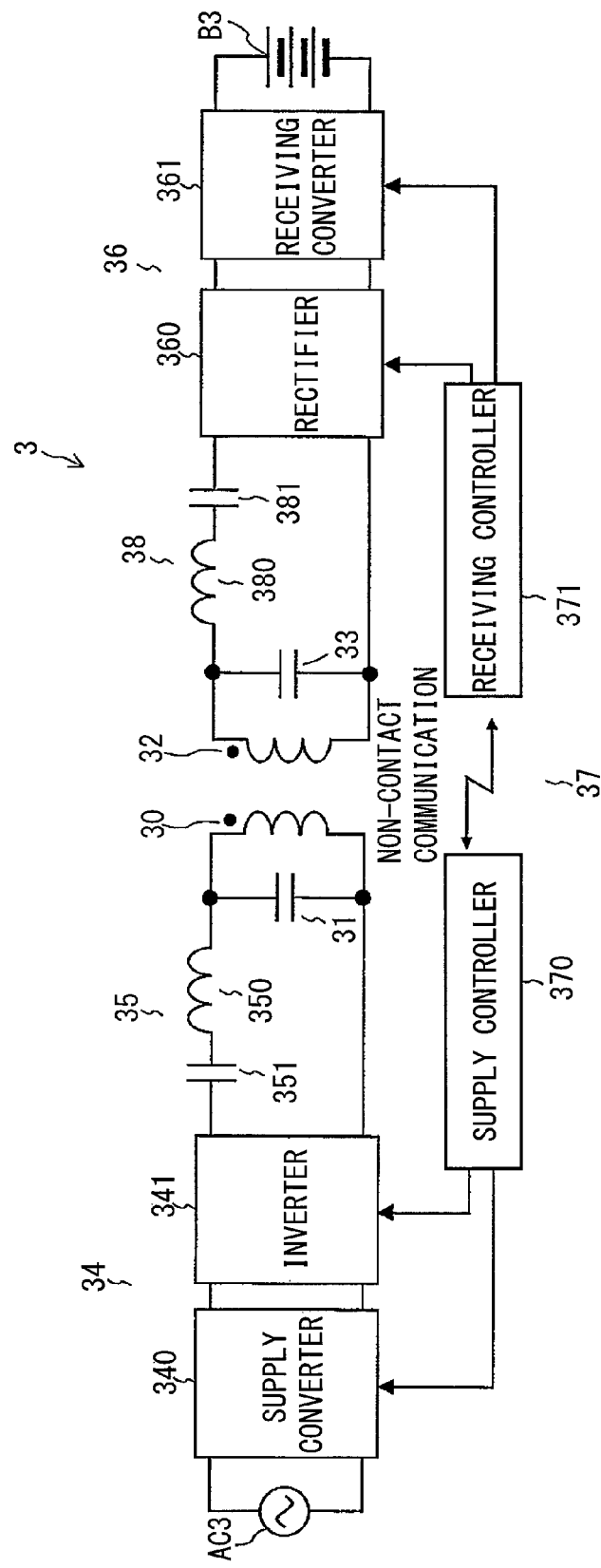
FIG. 7 is a diagram showing a non-contact electricity supply device according to a third embodiment.

The non-contact electricity supply device 3 shown in FIG. 7 has a non-contact configuration to transmit an electricity from a commercial power source (AC power source) AC3 to a vehicular battery B2 thereby to charge the vehicular battery B3. The non-contact configuration of the non-contact electricity supply device 3 further enables to transmit an electricity from the vehicular battery B3 to the commercial power source AC3 thereby to supply an electric power to the commercial power source AC3. The non-contact electricity supply device 3 includes a power-supply-side coil 30, a power-supply-side capacitor 31, a power-receiving-side coil 32, a power-receiving-side capacitor 33, a power supply circuit (AC power source) 34, a power-supply-side filter circuit 35, a power receiving circuit 36, and a control circuit 37. The non-contact electricity supply device 3 further includes a power-receiving-side filter circuit 38.

The power-supply-side coil 30, the power-supply-side capacitor 31, the power-receiving-side coil 32, and the power-receiving-side capacitor 33 have configurations substantially equivalent to the configurations of the power-supply-side coil 10, the power-supply-side capacitor 11, the power-receiving-side coil 12, and the power-receiving-side capacitor 13 of first embodiment, respectively.

The power supply circuit 34 converts an alternating current, which is supplied from the commercial power source AC3, into an alternating current at a high frequency. The power supply circuit 34 further supplies the converted alternating current to the power-supply-side coil 30, to which the power-supply-side capacitor 31 is connected. The power supply circuit 34 further converts an alternating current, which is supplied from the power-supply-side coil 30 to which the power-supply-side capacitor 31 is connected, into a direct current. The power supply circuit 34 further supplies the converted direct current to the commercial power source AC3. The power supply circuit 34 includes a power-supply-side converter circuit 340 and an inverter circuit 341.

The power-supply-side converter circuit 340 converts an alternating current, which is supplied from the commercial power source AC3, into a direct current. The power-supply-side converter circuit 340 further supplies the converted direct current to the inverter circuit 341. The power-supply-side converter circuit 340 further converts a direct current, which is supplied from the inverter circuit 341, into an alternating current. The power-supply-side converter circuit 340 further supplies the converted alternating current to the commercial power source AC3. The power-supply-side converter circuit 340 is configured with a rectification circuit and a bidirectional DC/DC converter circuit. The rectification circuit includes IGBTs in a bridge connection. Each of the IGBTs is connected in anti-parallel with a freewheel diode (flywheel diode). The power-supply-side converter circuit 340 rectifies an alternating current, which is supplied from the commercial power source AC3, by using the freewheel diodes to convert the supplied alternating current into a direct current. The power-supply-side converter circuit 340 causes the bidirectional DC/DC converter circuit to further convert the converted direct current into a direct current at a different voltage. Thus, the power-supply-side converter circuit 340 supplies the converted direct current to the inverter circuit 341. The power-supply-side converter circuit 340 is further configured to cause the bidirectional DC/DC converter circuit to convert a direct current, which is supplied from the inverter circuit 341, into a direct current at a different voltage. The power-supply-side converter circuit 340 is further configured to implement a switching operation of the IGBTs to convert the direct current into an alternating current. Thus, the power-supply-side converter circuit 340 supplies the converted alternating current to the commercial power source AC3. The power-supply-side converter circuit 340 is connected to both the commercial power source AC3 and the inverter circuit 341.

The inverter circuit 341 converts a direct current, which is supplied from the power-supply-side converter circuit 340, into an alternating current, which is in a rectangular waveform and at a high frequency. The inverter circuit 341 further supplies the converted alternating current to the power-supply-side coil 30, to which the power-supply-side capacitor 31 is connected. The inverter circuit 341 is further configured to rectify an alternating current, which is supplied from the power-supply-side coil 30 to which the power-supply-side capacitor 31 is connected, to convert the alternating current into a direct current. The inverter circuit 341 further supplies the converted direct current to the power-supply-side converter circuit 340. The inverter circuit 341 includes IGBTs in a bridge connection. Each of the IGBTs is connected in anti-parallel with a freewheel diode (flywheel diode). The inverter circuit 341 implements a switching operation of the IGBTs to convert a direct current, which is supplied from the power-supply-side converter circuit 340, into an alternating current, which is in a rectangular waveform and at a high frequency. The inverter circuit 341 further supplies the converted alternating current to the power-supply-side coil 30, to which the power-supply-side capacitor 31 is connected. The inverter circuit 341 is further configured to rectify an alternating current, which is supplied from the power-supply-side coil 30 to which the power-supply-side capacitor 31 is connected, to convert the alternating current into a direct current by using the freewheel diodes in a state where the IGBTs are deactivated. The inverter circuit 341 further supplies the converted direct current to the power-supply-side converter circuit 340. The inverter circuit 341 is connected to the power-supply-side converter circuit 340. The inverter circuit 341 is further connected through the power-supply-side filter circuit 35 to the power-supply-side coil 30, to which the power-supply-side capacitor 31 is connected.

The power-supply-side filter circuit 35 includes a reactor 350 and a capacitor 351. The power-supply-side filter circuit 35 has a configuration, which is substantially equivalent to a configuration of the power-supply-side filter circuit 15 of the first embodiment.

The power-receiving-side filter circuit 38 removes a predetermined frequency component included in an alternating current supplied from a rectification circuit 360. The power-receiving-side filter circuit 38 includes a reactor 380 and a capacitor 381, which are connected in series with each other. The power-receiving-side filter circuit 38 is connected between the power-receiving-side coil 32, to which the power-receiving-side capacitor 33 is connected, and the power receiving circuit 36.

A circuit, which is configured with the power-receiving-side filter circuit 38, the power-receiving-side capacitor 33, and the power-receiving-side coil 32, has an impedance having a frequency characteristic viewed from the power receiving circuit 36. The frequency characteristic includes one maximum point A and two minimum points B and C, similarly to the frequency characteristic of the circuit, which is configured with the power-supply-side filter circuit 15, the power-supply-side capacitor 11, and the power-supply-side coil 10, viewed from the power supply circuit 14, as described in the first embodiment.

The inductance of the reactor 380 and the capacitance of the capacitor 381 are set, such that a frequency of a minimum point, which is formed on the high-frequency side than a frequency of a maximum point, is greater than a frequency of the fundamental wave of an alternating current, which is in a rectangular waveform and supplied from the rectification circuit 360, and is less than a frequency of a third order wave of the fundamental wave, when an electricity is transmitted from the vehicular battery B3 to the commercial power source AC3. Specifically, the inductance of the reactor 380 and the capacitance of the capacitor 381 are set, such that the frequency of the minimum point, which is formed on the high-frequency side relative to the frequency of the maximum point, is greater than the frequency of the fundamental wave and less than a frequency of a second order wave of the fundamental wave. More specifically, the inductance of the reactor 380 and the capacitance of the capacitor 381 are set, such that the frequency of the minimum point, which is formed on the high-frequency side relative to the frequency of the maximum point, is 1.7 times the frequency of the fundamental wave.

The power receiving circuit 36 receives an alternating current supplied from the power-receiving-side coil 32, to which the power-receiving-side capacitor 33 is connected, and rectifies the received alternating current to convert the received alternating current into a direct current. The power receiving circuit 36 further supplies the converted direct current to the vehicular battery B3. The power receiving circuit 36 is further configured to convert a direct current, which is supplied from the vehicular battery B3, into an alternating current. The power receiving circuit 36 is further configured to supply the converted alternating current to the power-receiving-side coil 32, to which the power-receiving-side capacitor 33 is connected. The power receiving circuit 36 is equipped with the rectification circuit 360 and a power-receiving-side converter circuit 361.

The rectification circuit 360 rectifies an alternating current, which is supplied from the power-receiving-side coil 32, to which the power-receiving-side capacitor 33 is connected, through the power-receiving-side filter circuit 38 to convert the supplied alternating current into a direct current. The rectification circuit 360 further supplies the converted direct current to the power-receiving-side converter circuit 361. The rectification circuit 360 is further configured to convert a direct current, which is supplied from the power-receiving-side converter circuit 361, into an alternating current, which is in a rectangular waveform and at a high frequency. The rectification circuit 360 is further configured to supply the converted alternating current through the power-receiving-side filter circuit 38 to the power-receiving-side coil 32, to which the power-receiving-side capacitor 33 is connected. The rectification circuit 360 includes IGBTs in a bridge connection. Each of the IGBTs is connected in anti-parallel with a freewheel diode (flywheel diode). The rectification circuit 360 rectifies an alternating current, which is supplied from the power-receiving-side coil 32, to which the power-receiving-side capacitor 33 is connected, through the power-receiving-side filter circuit 38 to convert the supplied alternating current into a direct current by using the freewheel diodes in a state where the IGBTs are de-activated. The rectification circuit 360 further supplies the converted direct current to the power-receiving-side converter circuit 361. The rectification circuit 360 is further configured to implement a switching operation of the IGBTs to convert a direct current, which is supplied from the power-receiving-side converter circuit 361, into an alternating current, which is in a rectangular waveform and at a high frequency. The rectification circuit 360 is further configured to supply the converted alternating current through the power-receiving-side filter circuit 38 to the power-receiving-side coil 32, to which the power-receiving-side capacitor 33 is connected. The rectification circuit 360 is connected to the power-receiving-side coil 32, to which the power-receiving-side capacitor 33 is connected, though the power-receiving-side filter circuit 38. The rectification circuit 360 is further connected to the power-receiving-side converter circuit 361.

The power-receiving-side converter circuit 361 converts a direct current, which is supplied from the rectification circuit 360, into a direct current at a different voltage. The power-receiving-side converter circuit 361 further supplies the converted direct current to the vehicular battery B3. The power-receiving-side converter circuit 361 is further configured to convert a direct current, which is supplied from the vehicular battery B3, into a direct current at a different voltage. The power-receiving-side converter circuit 361 is further configured to supply the converted direct current to the rectification circuit 360. The power-receiving-side converter circuit 361 is configured with a bidirectional DC/DC converter circuit. The power-receiving-side converter circuit 361 is connected to both the rectification circuit 360 and the vehicular battery B3.

The control circuit 37 controls the power supply circuit 34 and the power receiving circuit 36 thereby to transmit an electricity from the commercial power source AC3 to the vehicular battery B3. The control circuit 37 is further configured to control the power supply circuit 34 and the power receiving circuit 36 thereby to transmit an electricity from the vehicular battery B3 to the commercial power source AC3. The control circuit 37 includes a power-supply-side control circuit 370 and a power-receiving-side control circuit 371.

The power-supply-side control circuit 370 exchanges information, which is needed for control, with a power-receiving-side control circuit 371 via wireless communications, thereby to implement the control of the power-supply-side converter circuit 340 and the inverter circuit 341 to transmit an electricity from the commercial power source AC3 to the vehicular battery B3. The power-supply-side control circuit 370 is further configured to implement a control of the power-supply-side converter circuit 340 and the inverter circuit 341 to transmit an electricity from the vehicular battery B3 to the commercial power source AC3. The power-supply-side control circuit 370 is connected to both the power-supply-side converter circuit 340 and the inverter circuit 341.

The power-receiving-side control circuit 371 exchanges information, which is needed for control, with a power-supply-side control circuits 370 via wireless communications, thereby to implement the control of the rectification circuit 360 and the receiving side converter circuit 361 to transmit an electricity from the commercial power source AC3 to the vehicular battery B3. The power-receiving-side control circuit 371 is further configured to control the rectification circuit 360 and the receiving side converter circuit 361 thereby to transmit an electricity from the vehicular battery B3 to the commercial power source AC3. The power-receiving-side control circuit 371 is connected to both the rectification circuit 360 and the power-receiving-side converter circuit 361.

Subsequently, an operation of the non-contact electricity supply device of the third embodiment will be described with reference to FIG. 7. Operation to transmit an electricity from the commercial power source AC3 to the vehicular battery B3 is substantially equivalent to the operation of the non-contact electricity supply device 1 of the first embodiment. Therefore, description of the operation is omitted. In the subsequent description, an operation to transmit an electricity from the vehicular battery B3 to the commercial power source AC3 will be described.

The power-receiving-side converter circuit 361 is controlled by the power-receiving-side control circuit 371 to convert a direct current, which is supplied from the vehicular battery B3, into a direct current at a different voltage. The power-receiving-side converter circuit 361 supplies the converted direct current to the rectification circuit 360. The rectification circuit 360 is controlled by the power-receiving-side control circuit 371 to convert a direct current, which is supplied from the power-receiving-side converter circuit 361, into an alternating current, which is in a rectangular waveform and at a high frequency, such as tens of kHz. The rectification circuit 360 is further configured to supply the converted alternating current through the power-receiving-side filter circuit 38 to the power-receiving-side coil 32, to which the power-receiving-side capacitor 33 is connected. The power-receiving-side filter circuit 38 removes a predetermined frequency component included in an alternating current supplied from the rectification circuit 360. The power-receiving-side coil 32, to which the power-receiving-side capacitor 33 is connected, is supplied with an alternating current from the rectification circuit 360, thereby to generate an alternating magnetic flux.

A circuit, which is configured with the power-receiving-side filter circuit 38, the power-receiving-side capacitor 33, and the power-receiving-side coil 32, has an impedance having a frequency characteristic. In this frequency characteristic, a frequency of a minimum point, which is formed on the high-frequency side relative to a frequency of a maximum point, is 1.7 times a frequency of a fundamental wave of an alternating current, which is in a rectangular waveform and supplied from the rectification circuit 360. Therefore, a third order harmonics component of a fundamental wave of an electric current can be suppressed, and therefore, an alternating current close to a fundamental wave can be produced.

The power-supply-side coil 30, to which the power-supply-side capacitor 31 is connected, is interlinked with the alternating magnetic flux generated by the power-receiving-side coil 32 thereby to implement an electromagnetic induction to produce an alternating current. The inverter circuit 341 is controlled by the power-supply-side control circuit 370 to rectify an alternating current, which is supplied from the power-supply-side coil 30 to which the power-supply-side capacitor 31 is connected, to convert the alternating current into a direct current. The inverter circuit 341 further supplies the converted direct current to the power-supply-side converter circuit 340. The power-supply-side converter circuit 340 is controlled by the power-supply-side control circuit 370 to convert a direct current, which is supplied from the inverter circuit 341, into a direct current at a different voltage. The power-supply-side converter circuit 340 further supplies the converted direct current to the commercial power source AC3. In such a way, electricity can be transmitted from the vehicular battery B3 to the commercial power source AC1 in the non-contact configuration.

Subsequently, an operation effect of the third embodiment will be described.

The non-contact electricity supply device 3 according to the third embodiment has a non-contact configuration to transmit an electricity from the commercial power source AC3 to the vehicular battery B3 thereby to charge the vehicular battery B3. The non-contact configuration of the non-contact electricity supply device 3 further enables to transmit an electricity from the vehicular battery B3 to the commercial power source AC3 thereby to supply an electric power to the commercial power source AC3. In both cases, an operation effect, which is substantially equivalent to that of the non-contact electricity supply device 1 of the first embodiment, can be produced.

In the third embodiment, the exemplified power-supply-side filter circuit is configured with one pair of the reactor and the capacitor, which are connected in series with each other. The disclosure is not limited to the example of the third embodiment. The power-supply-side filter circuit may be configured with two pairs of the reactors and capacitors, which are connected in series, similarly to the non-contact electricity supply device 2 of the second embodiment.

According to the present disclosure, the non-contact electricity supply device includes the power-supply-side coil, the power-supply-side capacitor, the power-supply-side filter circuit, and the power-receiving-side coil. The power-supply-side coil is configured to be supplied with an alternating current from the AC power source to produce a magnetic flux. The power-supply-side capacitor is connected in parallel with the power-supply-side coil to form, with the power-supply-side coil, the resonant circuit. The power-supply-side filter circuit includes the reactor and the capacitor, which are connected in series, the power-supply-side filter circuit being connected between the AC power source and the power-supply-side coil, to which the power-supply-side capacitor is connected. The power-receiving-side coil is configured to be interlinked with a magnetic flux produced by the power-supply-side coil to produce an alternating current. The capacitance of the capacitor and the inductance of the reactor of the power-supply-side filter circuit, the capacitance of the power-supply-side capacitor, and the inductance of the power-supply-side coil are set, such that the power-supply-side filter circuit, the power-supply-side capacitor, and the power-supply-side coil form the circuit having the impedance having the frequency characteristic, wherein the frequency of the minimum point, which is formed on the high-frequency side relative to the maximum point, is greater than the frequency of the fundamental wave of an alternating current supplied from the AC power source and is less than the frequency of the third order wave of the fundamental wave.

The present configuration enables to increase an impedance to the third order harmonics component of the fundamental wave. Therefore, it is possible to suppress increase in an electric current of the third order harmonics component, which has a largest amplitude among odd-order harmonics components and is not effective to power supply. Thus, it is possible to reduce a loss caused by the harmonics component included in an alternating current supplied from the AC power source.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A non-contact electricity supply device comprising:
a power-supply-side coil configured to receive an alternating current, which is supplied from an AC power source to produce a magnetic flux;
a power-supply-side capacitor connected in parallel with the power-supply-side coil to form, with the power-supply-side coil, a resonant circuit;
a power-supply-side filter circuit connected between the AC power source and the power-supply-side coil, to which the power-supply-side capacitor is connected, the power-supply-side filter circuit including a reactor and a capacitor, which are connected in series; and
a power-receiving-side coil configured to be interlinked with a magnetic flux produced by the power-supply-side coil to produce an alternating current, wherein
the capacitance of the capacitor and the inductance of the reactor of the power-supply-side filter circuit, the capacitance of the power-supply-side capacitor, and the inductance of the power-supply-side coil are set, such that,
a circuit, which includes the power-supply-side filter circuit, the power-supply-side capacitor, and the power-supply-side coil, has an impedance having a frequency characteristic, in which a frequency of a minimum point of the impedance, which is formed on a high-frequency side relative to a maximum point of the impedance, is greater than a frequency of a fundamental wave of an alternating current supplied from the AC power source and is less than a frequency of a third order wave of the fundamental wave,
the capacitance of the capacitor and the inductance of the reactor of the power-supply-side filter circuit, the capacitance of the power-supply-side capacitor, and the inductance of the power-supply-side coil are set, such that, the frequency of the minimum point of the impedance formed on the high-frequency side relative to the maximum point of the impedance is other than a frequency of a second order wave of the fundamental wave of an alternating current supplied from the AC power source, the capacitance of the capacitor and the inductance of the reactor of the power-supply-side filter circuit, the capacitance of the power-supply-side capacitor, and the inductance of the power-supply-side coil are set, such that, the frequency of the minimum point of the impedance formed on the high-frequency side relative to the maximum point of the impedance is greater than the frequency of the second order wave of the fundamental wave of an alternating current supplied from the AC power source and is less than the frequency of the third order wave of the fundamental wave, and the capacitance of the capacitor and the inductance of the reactor of the power-supply-side filter circuit, the capacitance of the power-supply-side capacitor, and the inductance of the power-supply-side coil are set, such that, the frequency of the minimum point of the impedance formed on the high-frequency side relative to the maximum point of the impedance is 2.5 times the frequency of the fundamental wave of an alternating current supplied from the AC power source.

2. The non-contact electricity supply device according to claim 1, wherein the power-supply-side filter circuit includes two pairs each including a reactor having an equivalent inductance and a capacitor having an equivalent capacitance, one of the two pairs includes the reactor and the capacitor, which are connected in series between one output end of the AC power source and one end of the power-supply-side coil, to which the power-supply-side capacitor is connected, and an other of the two pairs includes the reactor and the capacitor, which are connected in series between an other output end of the AC power source and an other end of the power-supply-side coil, to which the power-supply-side capacitor is connected.

3. The non-contact electricity supply device according to claim 1, further comprising:

a rectification circuit configured to rectify an alternating current supplied from the power-receiving-side coil to convert the alternating current into a direct current.

4. The non-contact electricity supply device according to claim 3, further comprising:

a power-receiving-side converter circuit configured with a DC/DC converter circuit and connected to the rectification circuit, and the power-receiving-side converter circuit is configured to receive the direct current from the rectification circuit and to convert the direct current into a direct current at a different voltage.

5. The non-contact electricity supply device according to claim 4, further comprising:

a battery connected to the power-receiving-side converter circuit.

6. The non-contact electricity supply device according to claim 1, wherein the frequency of the fundamental wave is greater than a frequency at a center between the frequency of the minimum point of the impedance, which is formed on a low-frequency side relative to the maximum point of the impedance, and the frequency of the maximum point of the impedance.

* * * * *